US009584800B2

(12) United States Patent
Beck et al.

(10) Patent No.: US 9,584,800 B2
(45) Date of Patent: Feb. 28, 2017

(54) IMAGING SYSTEMS WITH PIXEL ARRAY VERIFICATION CIRCUITRY

(71) Applicant: Semiconductor Components Industries, LLC, Phoenix, AZ (US)

(72) Inventors: Jeffery Beck, Philomath, OR (US); Charles McCord, Corvallis, OR (US); Christopher Silsby, Albany, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 63 days.

(21) Appl. No.: 14/231,694

(22) Filed: Mar. 31, 2014

(65) Prior Publication Data

US 2015/0281684 A1  Oct. 1, 2015

(51) Int. Cl.
*H04N 17/00* (2006.01)
*H04N 17/02* (2006.01)
*G06T 7/00* (2006.01)
*H04N 17/04* (2006.01)
*H04N 1/00* (2006.01)
*H04N 5/367* (2011.01)
*H04N 5/369* (2011.01)
*H04N 5/374* (2011.01)

(52) U.S. Cl.
CPC ......... *H04N 17/002* (2013.01); *G06T 7/0018* (2013.01); *H04N 1/00021* (2013.01); *H04N 5/367* (2013.01); *H04N 5/3698* (2013.01); *H04N 5/374* (2013.01); *H04N 17/045* (2013.01)

(58) Field of Classification Search
CPC ............. H04N 1/00021; H04N 17/045; H04N 17/002; G06T 7/0018

USPC ......................................... 348/175, 187, 294
See application file for complete search history.

(56) References Cited

U.S. PATENT DOCUMENTS

| | | | |
|---|---|---|---|
| 5,654,537 A * | 8/1997 | Prater | H04N 1/00002 250/208.1 |
| 6,388,245 B1 | 5/2002 | Lee | |
| 6,489,798 B1 * | 12/2002 | Scott-Thomas | H04N 3/155 324/762.01 |
| 6,577,748 B2 | 6/2003 | Chang | |

(Continued)

FOREIGN PATENT DOCUMENTS

| | | |
|---|---|---|
| EP | 1881692 | 1/2008 |
| WO | 2008036289 | 3/2008 |

OTHER PUBLICATIONS

Honda, U.S. Appl. No. 14/185,542, filed Feb. 20, 2014.
Martinussen, U.S. Appl. No. 13/872,665, filed Apr. 29, 2013.

*Primary Examiner* — Ngoc-Yen Vu
(74) *Attorney, Agent, or Firm* — Treyz Law Group, P.C.; Jason Tsai; Zachary D. Hadd

(57) ABSTRACT

An imaging system may include an array of image pixels and verification circuitry. The verification circuitry may inject test voltages into the image pixel array during the photodiode reset operation. The test signals may then be read out using a correlated double sampling operation. Verification circuitry may compare the test signals to reference data to determine whether the imaging system is functioning properly (e.g., to determine whether the array of image pixels satisfies performance criteria). If the amount of mismatch between the test signals and the reference data exceed a predetermined threshold, the imaging system may be disabled and/or a warning signal may be presented to a user of the system.

20 Claims, 7 Drawing Sheets

(56) References Cited

U.S. PATENT DOCUMENTS

| | | | |
|---|---|---|---|
| 7,141,774 B2 | 11/2006 | Yuyama | |
| 7,595,474 B2* | 9/2009 | Sakuragi | H01L 27/14658 |
| | | | 250/208.1 |
| 7,747,087 B2 | 6/2010 | Laude et al. | |
| 7,791,664 B1 | 9/2010 | Koifman | |
| 7,804,052 B2* | 9/2010 | Chinnaveerappan | H04N 5/357 |
| | | | 250/208.1 |
| 7,872,645 B2* | 1/2011 | Myers | H04N 5/335 |
| | | | 250/208.1 |
| 8,531,566 B2* | 9/2013 | Cieslinski | H04N 5/367 |
| | | | 250/208.1 |
| 8,599,307 B2 | 12/2013 | Solhusvik | |
| 8,736,684 B1* | 5/2014 | Johansson | H04N 17/002 |
| | | | 348/180 |
| 8,803,979 B2* | 8/2014 | Solhusvik | H04N 17/002 |
| | | | 348/177 |
| 8,953,047 B2* | 2/2015 | Martinussen | H04N 17/002 |
| | | | 348/175 |
| 9,172,951 B2* | 10/2015 | Okita | H04N 5/374 |
| 2008/0225144 A1 | 9/2008 | Mauritzson | |
| 2010/0026783 A1 | 2/2010 | Chiu et al. | |
| 2010/0283875 A1 | 11/2010 | Naskali et al. | |
| 2013/0027565 A1 | 1/2013 | Solhusvik et al. | |
| 2014/0151532 A1* | 6/2014 | Ito | H04N 5/3575 |
| | | | 250/208.1 |
| 2015/0145850 A1* | 5/2015 | Rohatgi | G09G 3/3233 |
| | | | 345/212 |
| 2015/0288907 A1* | 10/2015 | Vampola | H01L 27/14643 |
| | | | 250/208.1 |

* cited by examiner

IMAGING SYSTEMS WITH PIXEL ARRAY VERIFICATION CIRCUITRY

BACKGROUND

This relates generally to imaging systems and, more particularly, to imaging systems that use verification circuitry to test the integrity of the imaging system.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

In automotive image sensors, it may be beneficial to the overall system integrity to be in compliance with well known automotive safety standards such as the ISO 26262 road vehicle functional safety standard. In order to comply with such types of safety standards, it may be desirable for automotive image sensors to perform self-checking procedures to determine whether the image sensor is operating properly. In particular, it may be desirable to determine whether an image pixel array within the image sensor satisfies performance criteria. In conventional automotive image sensors, it is impossible to impose a known photonic scene on the pixel array while the image sensor is embedded within the automobile. This presents a challenge for the system to test the safety of automotive image sensors.

It would therefore be desirable to provide improved imaging systems with capabilities to verify the functionality of the imaging system embedded within an automobile.

BRIEF DESCRIPTION OF THE DRAWINGS

FIGS. 5A-5F are diagrams showing different test voltage patterns that can be injected into an image pixel array in accordance with an embodiment of the present invention.

DETAILED DESCRIPTION

Figure 1:
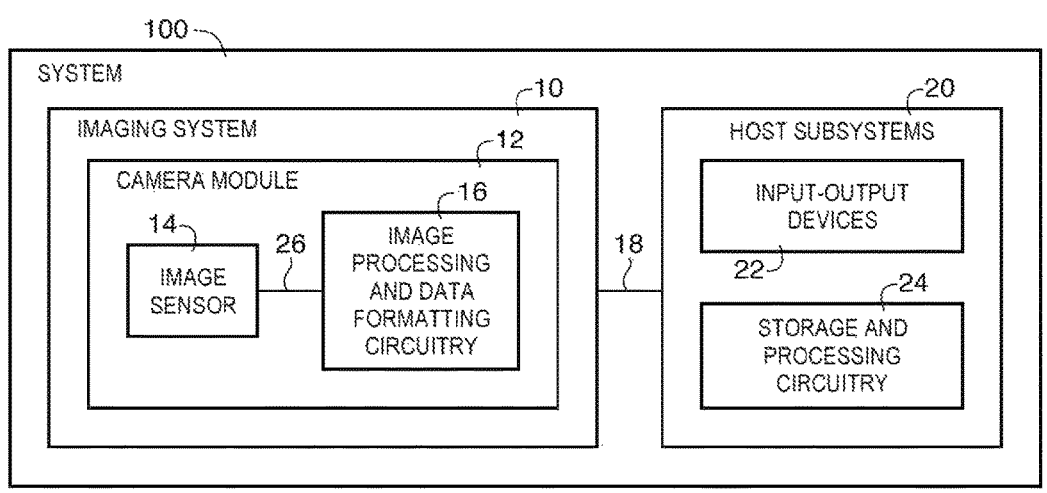
FIG. 1 is a diagram of an illustrative system that includes an imaging system and a host subsystem in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

In some configurations, verification image data may be compared with a predetermined standard stored in the imaging system, generated by the imaging system during operation, or stored on additional circuitry that is external to the imaging system. The predetermined standard may be an expected value, may be a mathematically determined threshold, may sometimes be referred to as a "golden" standard image, may be captured during manufacturing of the imaging system or at another suitable time (e.g., during startup or shutdown of the imaging system), and/or may include one or more mathematically or experimentally determined ranges to which verification image data may be compared.

Based on the result of the comparison of the verification image data with the predetermined standard or predetermined pattern, an imaging system may be disabled (e.g., if the result is outside the predetermined range or if the result does not match a reference signal) or may continue to operate normally (e.g., if the result is within the predetermined range or if the result matches a reference signal). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification data containing verification information. Verification data may be provided to image processing circuitry 16 and/or storage and processing circuitry 24. Image processing circuitry 16 may be configured to compare the verification data to a predetermined data set stored on image processing circuitry 16. Following the comparison, image processing circuitry 16 may send status information or other verification information to host subsystem 20.

Figure 2:
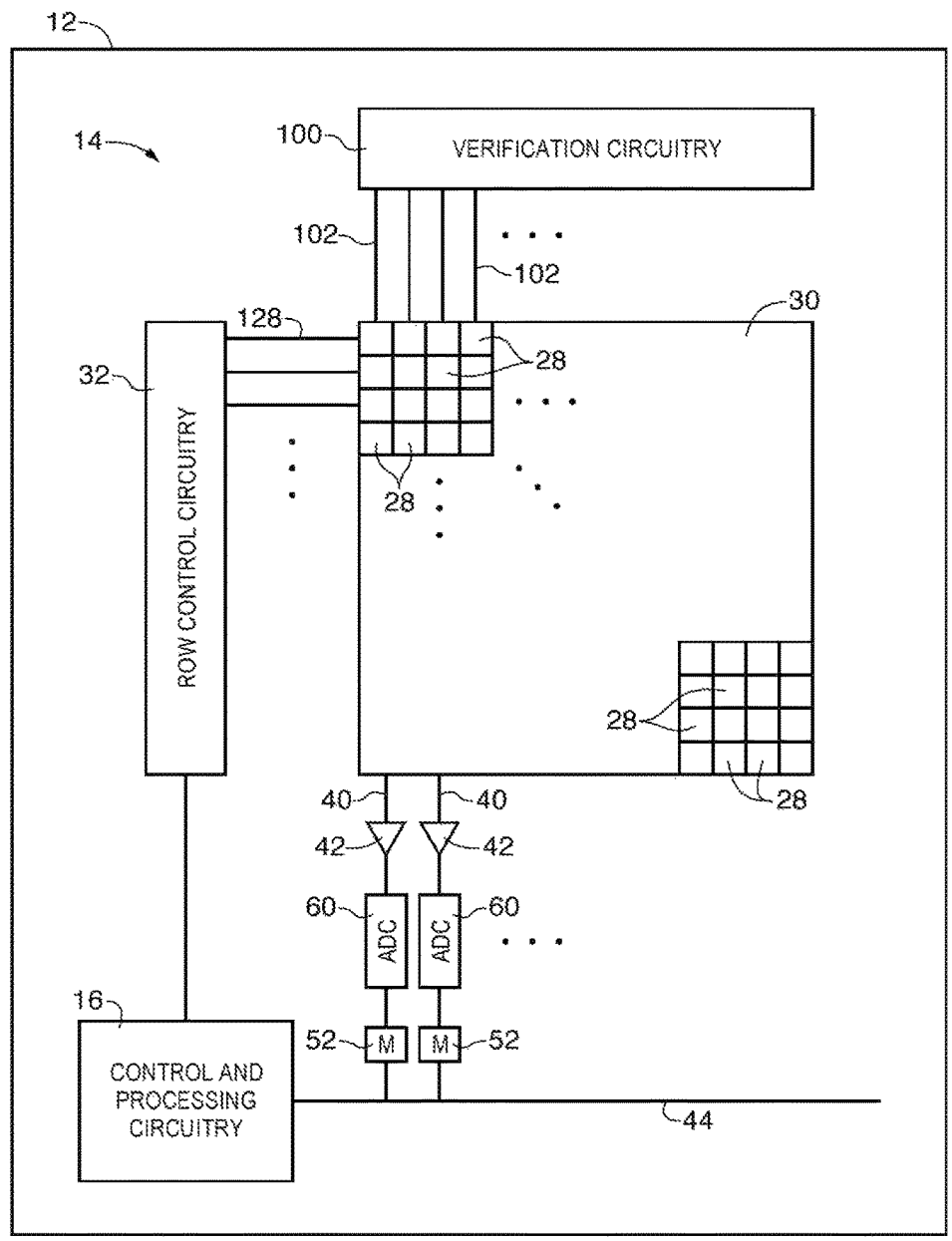
FIG. 2 is a diagram of an illustrative image sensor having an array of image pixels, verification circuitry, and control circuitry coupled to the array of image pixels in accordance with an embodiment of the present invention.

An example of an arrangement for camera module 12 is shown in FIG. 2. As shown in FIG. 2, camera module 12 includes image sensor 12 and control and processing circuitry 16. Image sensor 12 may include a pixel array such as array 30 of pixels 28. Control circuitry 16 may be coupled to row control circuitry 32 and global data path 44. Row control circuitry 32 may receive row addresses from control circuitry 16 and may supply corresponding row control signals to image pixels 28 over control paths 128. One or more conductive lines such as column lines 40 may be coupled to each column of image pixels 28 in image pixel array 30. Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out on column lines 40.

Each column line 40 may include column circuitry such as column amplifier 42, analog-to-digital converter (ADC) circuit 60, and memory circuit 52. ADC circuit 60 may be used to convert analog signals on column lines 40 into corresponding digital signals before outputting to a corresponding memory circuit 52.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Camera module 12 may include verification circuitry such as verification circuitry 100. Verification circuitry 100 may be used to inject test signals into one or more pixels 28 in array 30. The test signals may be output on column lines 40 and converted to a digital test signal by ADC circuit 60. A portion of control circuitry 16 (which is sometimes considered to be a part of verification circuitry 100) may compare the output test signals with reference data to determine whether or not image sensor 14 is functioning properly.

Row control circuitry 32 may generate signals on paths 128 as desired. For example, row control circuitry 32 may generate reset signals on reset lines in paths 128, transfer signals on transfer lines in paths 128, and row select (e.g., row readout) signals on row select lines in paths 128 to control the operation of array 14. If desired, row control circuitry 32 and array 30 may be integrated together in a single integrated circuit (as an example).

Figure 3:
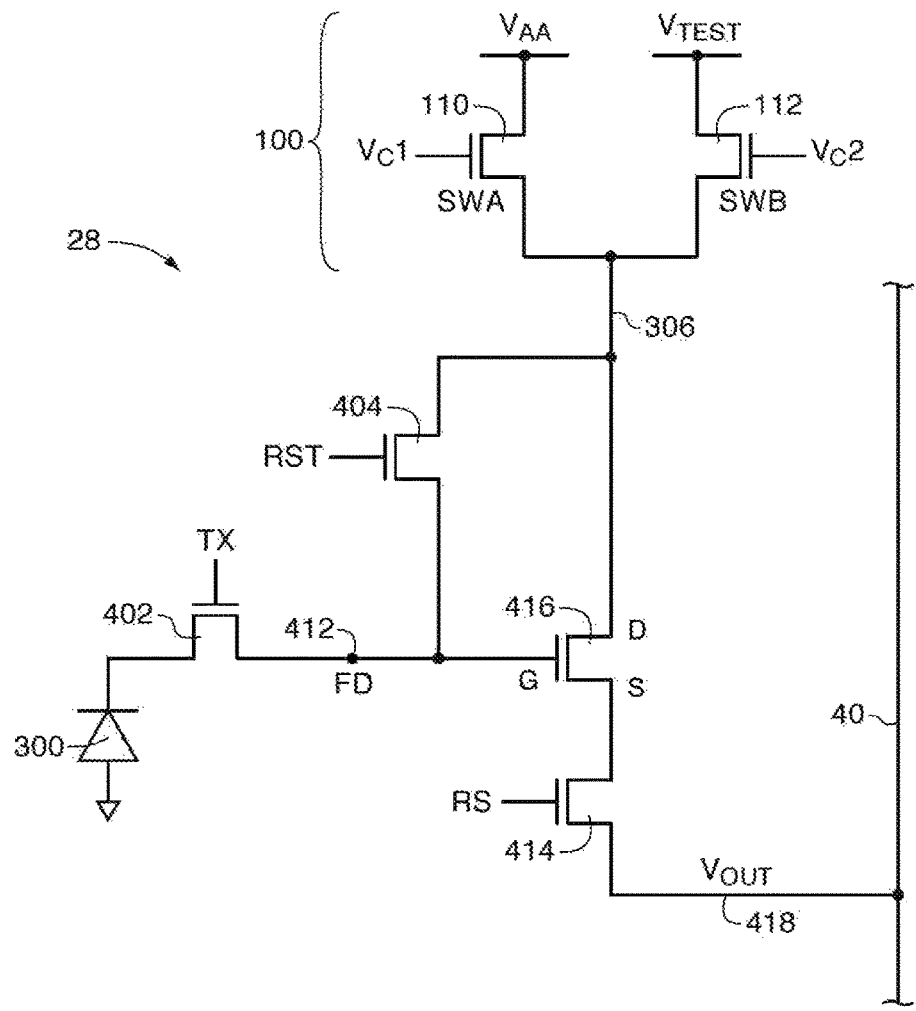
FIG. 3 is a diagram of an illustrative image pixel having a photodiode that may receive a test voltage in accordance with an embodiment of the present invention.

FIG. 3 is an illustrative example of circuitry that may be used to inject a test voltage into the photodiode of a selected one of image pixels 28 (e.g., pixels 28 of FIG. 2). As shown in FIG. 3, a first switch 110 (i.e., SWA) may be configured to route voltage $V_{AA}$ to an internal pixel voltage supply line 306, whereas a second switch 112 (i.e., SWB) may be configured to route voltage $V_{TEST}$ to internal pixel voltage supply line 306. Voltage $V_{TEST}$ may be used during a test signal injection phase, whereas voltage $V_{AA}$ may serve as a power supply source for pixel 28 during normal operation (e.g., for resetting the floating diffusion node, for providing power to the source follower transistor, etc.). Voltage $V_{AA}$ may therefore sometimes be referred to as a reset voltage or a positive power supply voltage.

In general, at most one of switches SWA and SWB should be activated at any given point in time (e.g., if SWA is on, then SWB has to be turned off, and vice versa). Switch SWA may be an n-channel pass transistor that is controlled by signal Vc1, whereas switch SWB may be an n-channel pass transistor that is controlled by signal Vc2. Control signals Vc1 and Vc2 may be selectively asserted to activate SWA and SWB, respectively. This is merely illustrative. If desired, switches SWA and SWB may be implemented using p-channel transistors, transmission gates, or other suitable types of switching circuits.

Image pixel 28 may include a photosensitive element such as photodiode 300, a charge transfer transistor 402 (sometimes referred to as a charge transfer gate), a reset transistor 404, a source follower transistor 416, and a row select transistor 414. Photodiode 300 may have a first (p-type) terminal that is coupled to ground and a second (n-type) terminal that is coupled to charge transfer transistor 402. Transistor 402 may have a first source-drain terminal that is coupled to photodiode 300, a second source-drain terminal that is coupled to a floating diffusion (FD) node 412, and a gate terminal that receives charge transfer control signal TX. Reset transistor 404 may be coupled between internal pixel voltage supply line 306 and the FD node and may be controlled by floating diffusion reset signal RST. Source follower transistor may have a drain terminal that is coupled to supply line 306, a gate terminal that is coupled to the FD node 412, and a source terminal that is coupled to column output line via row select transistor 414 and output path 418. Row select transistor 414 may be controlled using signal RS.

In general, signal TX may be asserted to allow transfer of charge from photodiode 300 to the FD node 412. Signal RST may be asserted to reset at least the FD node to a selected one of voltages $V_{AA}$ or $V_{TEST}$. Signal RS may be asserted to output a pixel signal from a selected image pixel to output column line 40. This particular arrangement of pixel 28 of FIG. 3 is merely illustrative and does not serve to limit the scope of the present invention. If desired, pixel 28 can have more control transistors, fewer control transistors, and can be implemented in other ways to support rolling shutter schemes, global shutter schemes, and other types of pixel operation.

During normal operation of the pixel array, switch SWA may be closed while switch SWB may be opened to allow internal pixel power supply line 306 to be driven to nominal power supply voltage level $V_{AA}$. Typical pixel operations may be carried out in three phases: (i) a photodiode reset period (sometimes referred to as the "shutter" period), (ii) an exposure period, and (iii) a readout period. During the photodiode reset period, photodiode 300 may be reset to its pinning voltage (e.g., voltage level $V_{AA}$) while transistors 110, 404, and 402 are all on. Once photodiode 300 has been reset, transistors 402 and 404 are turned off, and photodiode 300 begins to collect charge generated from impinging photons (e.g., photodiode 300 collects electrons generated as a result of light in the current scene to be imaged). This period during which photodiode 300 collects charge is known as the exposure period.

The exposure period is followed by the readout period. During the readout period, reset transistor 404 may be temporarily turned on to reset the floating diffusion node (e.g., to reset the floating diffusion node to $V_{AA}$) while transistor 402 is off. At this point, a reset signal can be read out from pixel 28. Thereafter, transistor 402 may be temporarily turned on to transfer any accumulated charge in photodiode 300 to the floating diffusion node while transistor 404 is off.

The voltage level of the floating diffusion node may change according to the amount of charge that has been transferred from photodiode 300. For example, consider a scenario in which a large number of electrons has been collected by photodiode 300. When signal TX is asserted, this large number of electrons may flow into FD node 412 and cause a large voltage drop at the FD node. Consider another scenario in which a relatively small number of electrons has been collected by photodiode 300. When signal TX is asserted, this smaller number of electrons may flow into FD node 412 and cause a relatively smaller voltage drop at the FD node.

At this point, an image signal can be read out from pixel 28 (i.e., an image signal having a voltage level that is proportional to the amount of charge that has been collected during the exposure period). Thereafter, the reset signal and the image signal can be combined to obtain a pixel signal, marking the end of the readout period. As an example, the pixel signal may be obtained by computing the difference between the reset signal and the image signal. Computing a final pixel readout value in this way may be an effective way to maximize signal-to-noise ratio and is sometimes referred to as the correlated double sampling (CDS) scheme.

In certain applications such as in vehicle safety systems or other systems in which the reliability and accuracy of the imaging system are critical, it may be desirable to verify the functionality of the pixel array prior to normal operation and/or during normal pixel operation. During pixel array testing/verification operations, switch SWB may be closed while switch SWA is opened to allow internal pixel power supply line 306 to be driven to $V_{TEST}$. In general, test signal $V_{TEST}$ may be a logical "1" voltage signal, a logical "0" voltage signal, or an analog voltage signal having an intermediate voltage level that is between positive power supply voltage $V_{AA}$ and ground.

The test signal $V_{TEST}$ may be injected into photodiode 300 by turning on both reset transistor 404 and charge transfer transistor 402 (e.g., by asserting signals RST and TX). Operated in this way, photodiode 300 may be driven to the test voltage level during the shutter period. As described above, the test voltage level need not be equal to the pinning voltage level of the photodiode. At this point, transfer transistor 402 and/or reset transistor 404 may optionally be turned off.

Following the test signal injection phase, switch SWB may be switched out of use while switch SWA may be switched into use (e.g., so that line 306 is driven to $V_{AA}$ instead of $V_{TEST}$). Immediately after the test signal injection period, normal CDS readout operations may be performed. Performing the readout operation immediately following the test signal injection period bypasses the exposure period, which minimizes the chance of photodiode 300 being corrupted by any ambient light source. This ensures that the amount of charge collected by photodiode 300 is only proportional to the injected test voltage $V_{TEST}$ and not affected by ambient light levels.

Reset transistor 404 may then be used to route voltage $V_{AA}$ to the FD node, thereby resetting floating diffusion node 412 to $V_{AA}$. Thereafter, the normal CDS operation can be performed to obtain a corresponding output test signal.

Sample and hold circuitry (not shown) may route the output test signal to ADC circuits 60 (FIG. 2) for conversion to a digital output test signal. ADC circuit 60 may provide the digital output test signal to processing circuitry 16, which may in turn use the test signal to determine whether or not image sensor 14 is functioning properly. Test signals from each pixel in the entire image pixel array may be read out using this approach. Test signals gathered from an image pixel array may form a test image frame.

In some configurations, image processing circuitry 16 of camera module 12 may be used to compare the test image frame with a known and/or predetermined reference image frame. In other configurations, host subsystem 20 may be used to compare the test image frame with a predetermined reference image frame. If the output test image does not match with the reference image, host subsystem 20 may be configured to disable some or all of imaging system 10 and, if desired, issue a warning to the operator of system 100 (e.g., issue a warning to the driver of an automobile that uses system 100). If desired, pixel array testing operations of this type may be performed during system startup and/or at the end of every frame. For example, during normal operation, the image sensor may be used to capture an image of the environment. The test operations for determining whether the array of image pixels satisfies performance criteria may be performed immediately prior to each image frame capture and/or immediately following each image frame capture to ensure that the image of the environment being captured is accurate.

Figure 4A:
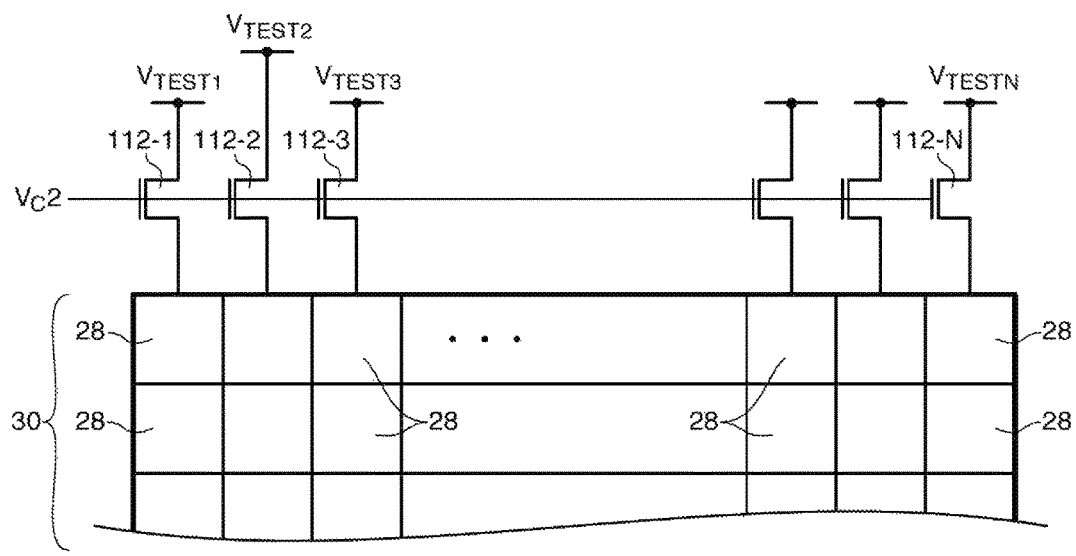
FIG. 4A is a diagram of an illustrative image pixel array having verification circuitry configured to inject different test voltages into image pixels arranged along a selected row in the array in accordance with an embodiment of the present invention.

In one suitable arrangement, each pixel column may be coupled to a different respective test switch 112 (see, e.g., FIG. 4A). As shown in FIG. 4A, a first column of image pixels 28 may receive a first test signal $V_{TEST1}$ via a first switch 112-1; a second column of image pixels 28 may receive a second test signal $V_{TEST2}$ via a second switch 112-2; a third column of image pixels 28 may receive a third test signal $V_{TEST3}$ via a third switch 112-3; . . . ; and an $N^{th}$ column of image pixels 28 may receive an $N^{th}$ test signal $V_{TESTN}$. Each of the N test voltages may be controlled independently. As an example, all N test voltages may have different voltage levels. As another example, at least some of the N test voltages may exhibit the same voltage level. In the example of FIG. 4A, all N switches 112 may be controlled by signal Vc2. Connected in this way, the N test voltage signals may be injected into a selected row of image pixels 28 in array 30.

Figure 4B:
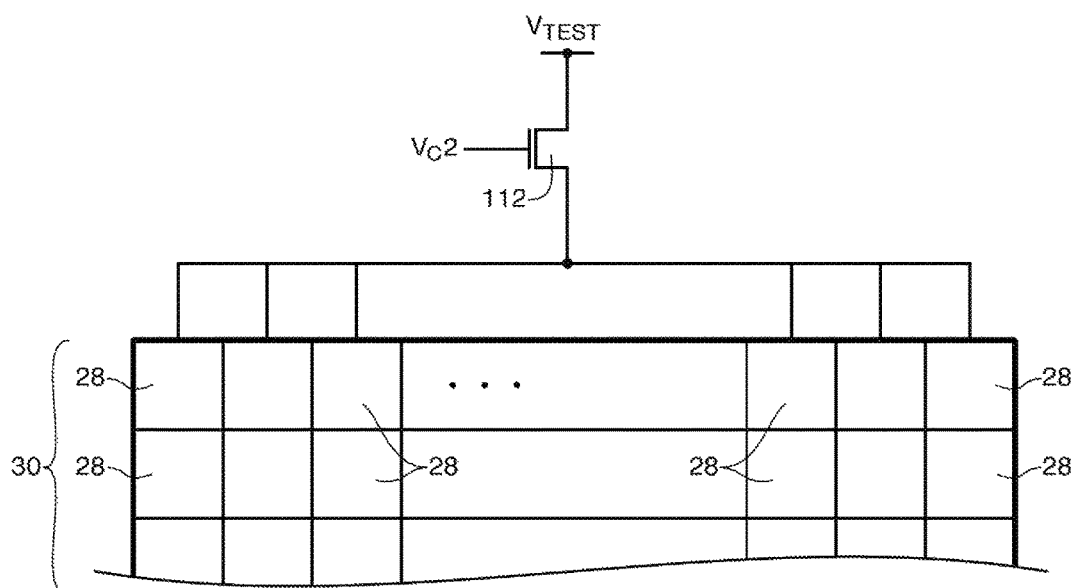
FIG. 4B is a diagram of an illustrative image pixel array having verification circuitry configured to inject a common test voltage into a selected row of image pixels in the array in accordance with an embodiment of the present invention.

In another suitable arrangement, each pixel column may be coupled to a common test switch 112 (see, e.g., FIG. 4B). As shown in FIG. 4B, test voltage $V_{TEST}$ may be injected into pixels 28 arranged along a given row in pixel array 30 using switch 112. Switch 112 may be controlled by signal Vc2. Connected in this way, each pixel along the same row will be injected with the same test voltage level. Voltage $V_{TEST}$ can, however, be adjusted on a row-by-row basis. For example, a first row of pixels 28 may be loaded with all ones; a second row of pixels 28 may be loaded with all zeroes; a third row of pixels 28 may be loaded with intermediate voltage levels; etc.

The configurations of FIGS. 4A and 4B are merely illustrative. In yet other suitable arrangements, different groups of pixel columns may be coupled to respective test voltage injection switches. For example, a first half of the pixel columns may receive a first test voltage via a first switch 112, whereas a second half of the pixel columns may receive a second test voltage via a second switch 112. As another example, a quarter of the pixel columns may be configured to receive a first test voltage via a first switch 112 while the remaining pixel columns receive a second test voltage via a second switch 112.

Figures 5A, 5B, 5C, 5D, 5E, 5F:
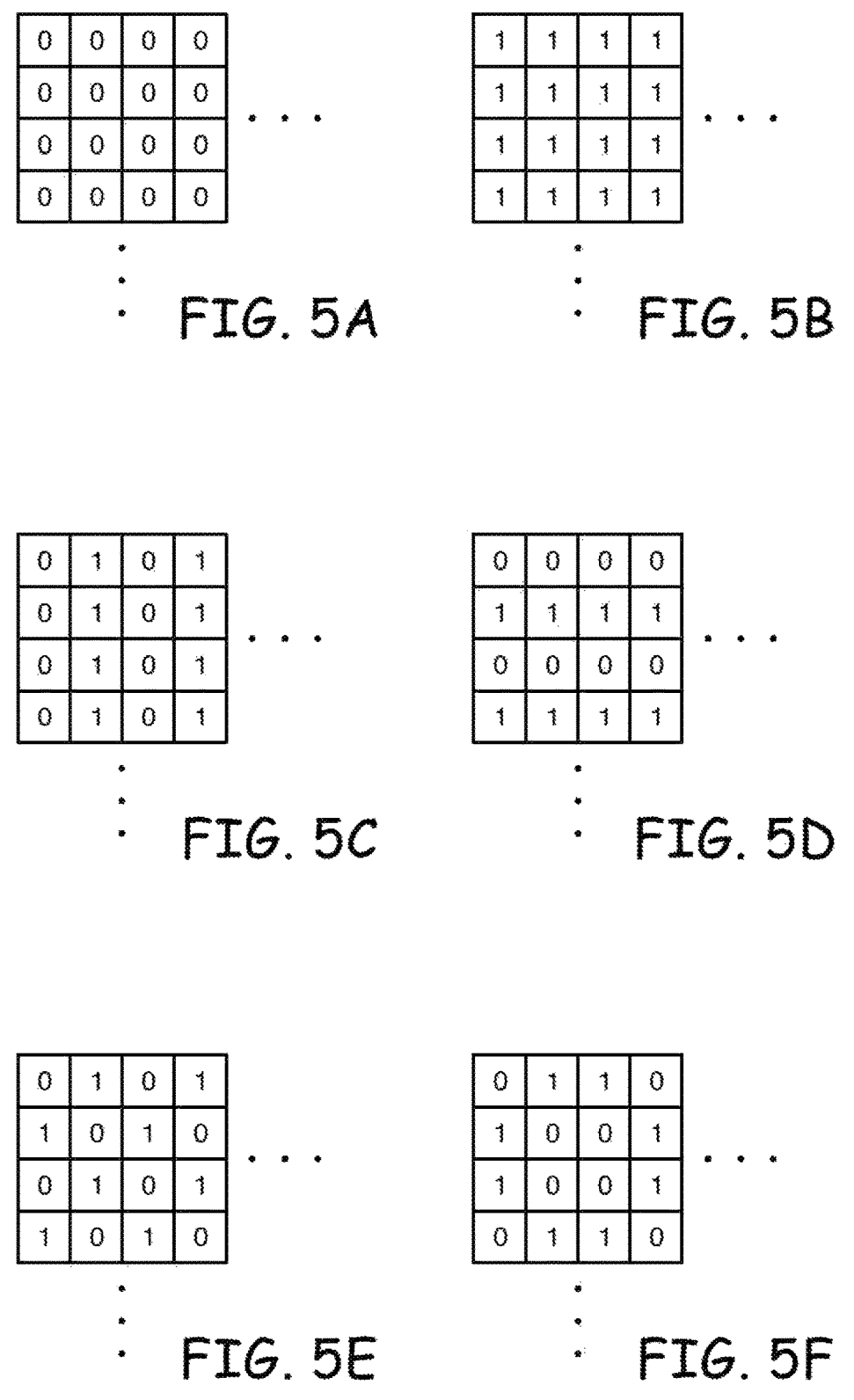

In general, verification circuitry 100 (FIG. 3) may be used to load any desired pattern of test signals into the pixel array to determine whether the pixel array satisfies performance criteria. FIGS. 5A-5F show different test patterns that can be injected into the pixel array during verification operations. As shown in FIG. 5A, an array of all zeroes can be loaded into the pixel array. As shown in FIG. 5B, an array of all ones can be loaded into the pixel array.

In the example of FIG. 5C, alternating columns of zeroes and ones can be loaded into the pixel array. Such types of patterns where values differ from column to column can be obtained using an arrangement of the type shown in FIG. 4A in which different columns can receive different test voltage signals (as an example). In an alternate implementation, the "even" pixel columns may receive zeroes from a first common switch, whereas the "odd" pixel columns may receive ones from a second common switch.

In the example of FIG. 5D, alternating rows of zeroes and ones can be loaded into the pixel array. Such types of patterns where the test signal values differ from row to row can only be obtained using a rolling shutter scheme where the pixel array is reset on a row by row basis. FIGS. 5E and 5F show other suitable patterns that can be loaded into the pixel array. The patterns shown in FIG. 5 are merely illustrative. In general, any desired pattern of zeroes, ones, and intermediate analog voltage values may be loaded into the pixel array for comparison with reference data. If desired, the test pattern may be a logo that is recognizable to a user of system 100 such that a problematic defect to the image sensor can be recognizable to the user.

Figure 6:
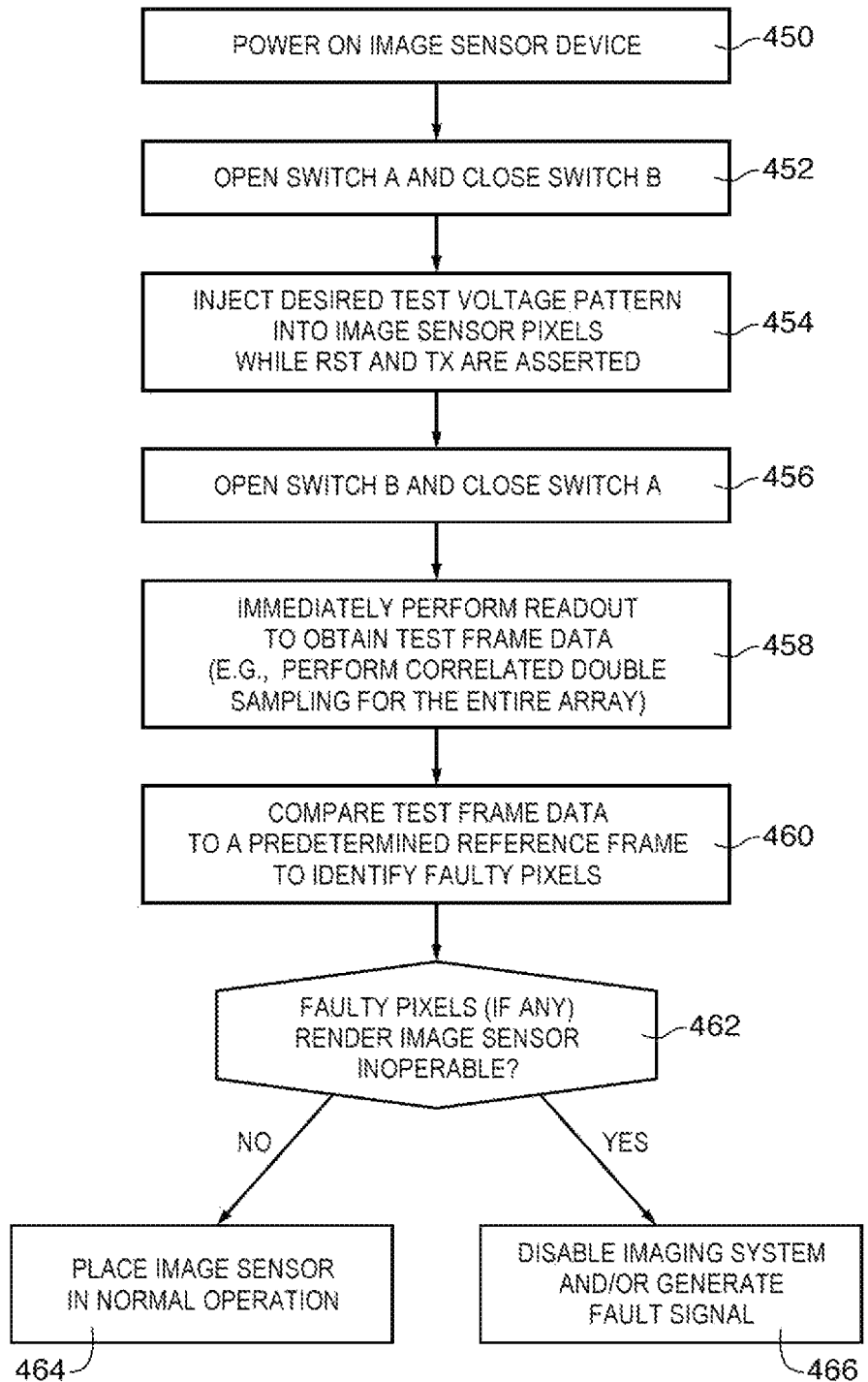
FIG. 6 is a flowchart of illustrative steps that may be used to perform pixel array verification operations in accordance with an embodiment of the present invention.

FIG. 6 is a flowchart showing illustrative steps involved in operating a system that includes an image sensor with verification capabilities such as imaging system 100 of FIG. 2.

At step 450, imaging system 100 may be powered on. At step 452, switch SWA may be turned off, and switch SWB may be turned on so that test voltage signals can be passed to the internal pixel power supply line in the selected pixel of each column. At step 454, the test voltages $V_{TEST}$ may be injected into the image sensor pixels while control signals RST and TX are asserted. The injection of the test voltages may be simultaneously performed across the entire array (in a global shutter scheme) or may be performed on a row by row basis (in a rolling shutter scheme). Once the test voltages have been injected, signals RST and TX can be deasserted.

At step 456, switch SWB may be turned off, and switch SWA may be turned on so that nominal power supply voltage $V_{AA}$ can be used to reset the floating diffusion node of the selected pixel in each column. After the test injection phase, the readout phase may be immediately performed to obtain test frame data (e.g., step 458, CDS operations can be immediately performed to bypass the exposure period).

At step 460, the test frame data may be output to processing circuitry 16 or optionally to host 20 (FIG. 1). At this step, the test frame data may be compared to a predetermined reference frame to identify faulty pixels (e.g., using processing circuitry 16 or host 20). At step 462, host 20 may be used to determine whether the faulty pixels (if any) would render image sensor 14 inoperable. The mere presence of faulty pixels does not necessarily mean that image sensor 14 has to be discarded. For example, if the faulty pixels are evenly distributed throughout the pixel array, image sensor 14 may still pass design criteria. If, however, the faulty pixels are concentrated in a small cluster, image sensor 14 may be considered unsatisfactory.

In response to host 20 determining that the pixel array is still operable, imaging system 10 may resume the cycle of image capture and imaging system verification while system 100 continues to operate (step 464).

In response to host 20 determining that the pixel array is inoperable, host subsystem 20 may disable some or all of imaging system 10 and, if desired, generate a fault signal such as an audible or visible failure alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 7:
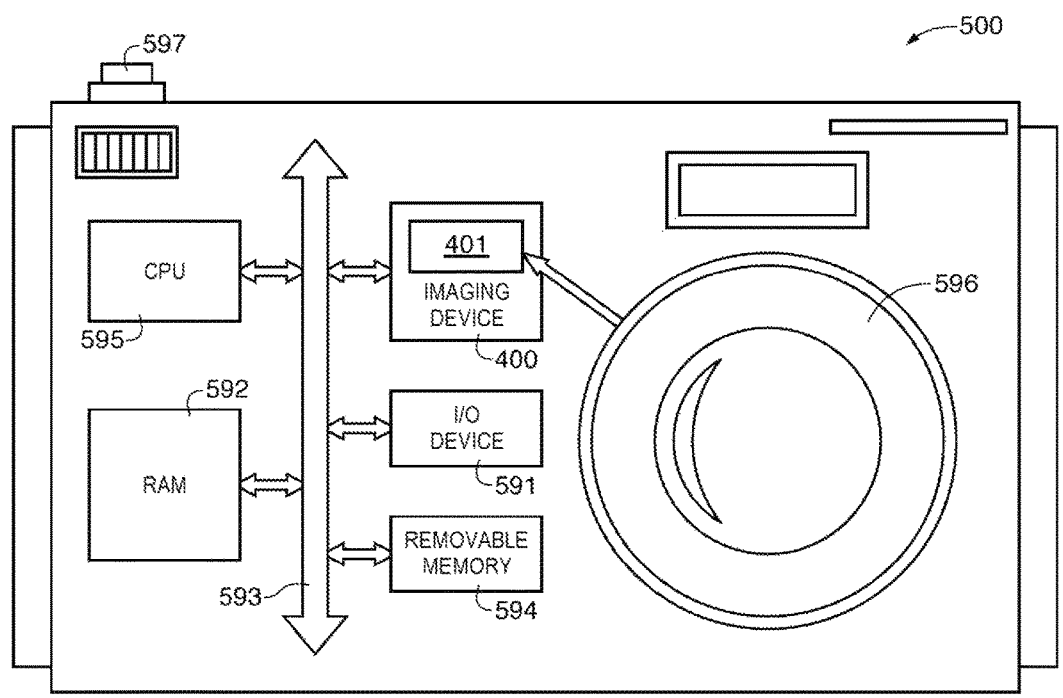
FIG. 7 is a block diagram of a system employing the embodiments of FIGS. 1, 2, 3, 4, and 5 in accordance with an embodiment of the present invention.

FIG. 7 shows in simplified form a typical processor system 500, such as a digital camera, which includes an imaging device 400. Imaging device 400 may include a pixel array 401 having pixels of the type shown in FIG. 3 (e.g., pixel array 401 may be an array of pixels 28) formed on an image sensor SOC. Test voltages may be injected into pixel array 401 and then read out using the methods described above. Verification circuitry may compare a test frame that has been read out from the pixel array with a reference frame to determine whether the image pixel array is functioning properly.

Processor system 500 is exemplary of a system having digital circuits that may include imaging device 400. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array such as pixel array 401 when shutter release button 597 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 400 may also communicate with CPU 595 over bus 593. System 500 may include random access memory (RAM) 592 and removable memory 594. Removable memory 594 may include flash memory that communicates with CPU 595 over bus 593. Imaging device 400 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

An imaging system may include verification circuitry. The verification circuitry may be used to inject a test image frame into the array of image pixels. In general, any desired pattern of test voltages may be injected into the array of image pixels using one or more switches. Once the test image has been loaded into the array (e.g., via a global shutter photodiode reset scheme or a rolling shutter photodiode reset scheme), the test signals may be immediately read out to bypass the exposure period.

The test image frame that has been read out from the array may then be compared to a predetermined reference image frame to determine whether the array of image sensor pixels satisfies performance criteria. Even if there are some faulty pixels, the array of pixel arrays may still be able to operate properly if the faulty pixels are not clustered together or if the faulty pixels are located in a region of the image sensor that is considered non-critical. If the amount of mismatch between the test image frame and the reference frame exceeds a threshold, the imaging system may be disabled and/or a warning signal may be presented to a user of the system.

The foregoing is merely illustrative of the principles of this invention which can be practiced in other embodiments.

What is claimed is:

1. A method of operating an imaging system having an image sensor that includes an array of image pixels arranged in rows and columns, comprising:
    loading a test image into the array, wherein each image pixel in the array includes a photodiode, and wherein loading the test image into the array comprises:
        asserting a single control signal at the gate of at least one transistor coupled between the array of image pixels and verification circuitry that provides test voltage signals; and
        in response to the single control signal, injecting a test voltage signal from the verification circuitry into at least one of the photodiodes in each of the columns in the array, wherein the test voltage signal comprises an analog signal having an intermediate voltage level;
    reading out the test image from the array; and
    comparing the test image that has been read out from the array to a reference image to determine whether the array of image pixels satisfies performance criteria.

2. The method defined in claim 1, further comprising:
    bypassing an exposure period by reading out the test image from the array immediately after loading the test image.

3. The method defined in claim 1, wherein reading out the test image from the array comprises performing correlated double sampling (CDS).

4. The method defined in claim 1, wherein loading the test image into the array comprises injecting different test voltage signals into respective columns in the array.

5. The method defined in claim 1, wherein loading the test image into the array comprises injecting different test voltage signals into respective rows in the array.

6. The method defined in claim 1, further comprising:
    capturing an image of the environment with the image sensor, wherein determining whether the array of image pixels satisfies performance criteria is performed immediately prior to capturing the image of the environment.

7. The method defined in claim 1, further comprising:
    capturing an image of the environment with the image sensor, wherein determining whether the array of image pixels satisfies performance criteria is performed immediately after capturing the image of the environment.

8. A method of operating an imaging system having an image sensor that includes an array of image pixels, wherein each image pixel includes a reset transistor and a photodiode, the method comprising:
    during a first time period, loading a first pattern of test voltages into a first row in the array of image pixels, wherein loading a test voltage in the first pattern of test voltages into an image pixel in the first row comprises:
        turning off a first switch that routes a power supply voltage to the reset transistor in the image pixel;
        while the first switch is turned off, turning on a second switch that routes the test voltage to the reset transistor in the image pixel; and
        while the second switch is turned on, turning on the reset transistor in the image pixel to route the test voltage to the photodiode in the image pixel;
    during a second time period, loading a second pattern of test voltages into a second row in the array of image pixels;
    reading out the first pattern of test voltages from the first row in the array of image pixels and reading out the second pattern of test voltages from the second row in the array of image pixels; and
    during a third time period, comparing the first and second patterns of test voltages that have been read out from the array of image pixels to predetermined test voltages to determine whether the array of image pixels satisfies design criteria.

9. The method defined in claim 8, wherein loading the first pattern of test voltages comprises loading identical test voltage values into each image pixel in the first row via a common switch.

10. The method defined in claim 8, wherein loading the first pattern of test voltages comprises loading different test voltage values into corresponding image pixels in the first row via respective switches.

11. The method defined claim 8, wherein reading out the first pattern of test voltages comprises reading out the first pattern of test voltages immediately after the first time period to bypass an exposure period.

12. The method defined in claim 8, wherein the second time period occurs after the first time period.

13. The method defined in claim 8, wherein the second time period occurs at the same time as the first time period, and wherein the first and second patterns of test voltages are identical.

14. A system, comprising:
    a central processing unit;
    memory;
    input-output circuitry; and
    an imaging device, wherein the imaging device comprises:
        an array of image pixels arranged in rows and columns, wherein each image pixel in the array comprises a reset transistor, a floating diffusion node, and a photodiode;
        a first switch configured to pass a reset voltage to each respective floating diffusion node in a given column of image pixels in the array when the respective reset transistors in the image pixels in the column are turned on; and
        a second switch configured to pass a test voltage to a respective photodiode in each column of image pixels in the array when the respective reset transistors in the image pixels are turned on, wherein the test voltage is immediately read out from the array after it has been loaded into the array to bypass an exposure period.

15. The system defined in claim 14, wherein the first and second switches comprise n-channel transistors.

16. The system defined in claim 14, wherein the first and second switches comprise p-channel transistors.

17. The system defined in claim 14, wherein the second switch is also configured to pass the test voltage to another column in the array of image pixels.

18. The system defined in claim 14, wherein the second switch is configured to pass the test voltage to a first image pixel in the column during a first time period, and wherein the second switch is further configured to pass a different test voltage to a second image pixel in the column during a second time period.

19. The system defined in claim 14, wherein the imaging device is operable in a rolling shutter mode.

20. The system defined in claim 14, wherein the imaging device is operable in a global shutter mode.

\* \* \* \* \*